United States Patent

Lu et al.

[11] Patent Number: 5,883,687
[45] Date of Patent: Mar. 16, 1999

[54] POLARIZATION INDEPENDENT LIQUID CRYSTAL PHASE GRATINGS FOR REFLECTIVE SPATIAL LIGHT MODULATORS

[75] Inventors: Minhua Lu, Mohegan Lake; Kei-Hsiung Yang, Katonah, both of N.Y.

[73] Assignee: International Business Machines Corporation, Armonk, N.Y.

[21] Appl. No.: 832,432

[22] Filed: Apr. 2, 1997

[51] Int. Cl.$^6$ .................................................. G02F 1/13
[52] U.S. Cl. .................... 349/201; 349/129; 349/180; 349/181
[58] Field of Search ................................ 349/201, 129, 349/180, 181

[56] References Cited

U.S. PATENT DOCUMENTS

| | | | |
|---|---|---|---|
| 4,896,947 | 1/1990 | Leenhouts | 349/180 |
| 4,952,030 | 8/1990 | Nakagawa et al. | 349/181 |
| 5,105,289 | 4/1992 | Sonehara et al. | 349/181 |
| 5,638,201 | 6/1997 | Bos et al. | 349/129 |
| 5,726,723 | 3/1998 | Wang et al. | 349/181 |

OTHER PUBLICATIONS

Fritsch, M. et al. (1989) "A Liquid–Crystal Phase Modulator for Large–Screen Projection" IEEE Transactions on Electron Devices, vol. 36, No. 9, pp. 1882–1887.

Gibbons, W.M. et al. (1991) "Surface–Mediated Alignment of Nematic Liquid Crystals with Polarized Laser Light" Nature, vol. 351, pp. 49–50.

Howard, W.E., "Active Matrix LCDs", Seminar Lecture Note of the 1989 SID International Symposium, pp. F–2/3 to F–2/31.

Hori, Y. et al. (1979) "Field–Controllable Liquid–Crystal Phase Grating" IEEE Transactions on Electron Devices, vol. ED–26, No. 11, pp. 1734–1737.

Bos, P.J. et al. (1995) "An Optically Active Diffractive Device of a High–Efficiency Light Valve", SID 95 Digest, pp. 601–604.

*Primary Examiner*—William L. Sikes
*Assistant Examiner*—Robert J. Hollingshead
*Attorney, Agent, or Firm*—Scully, Scott, Murphy & Presser; David M. Shofi

[57] ABSTRACT

A liquid crystal (LC) cell having LC phase gratings is disclosed. The LC cell includes alternating strips of a first single domain LC material having a twist angle with a magnitude and a positive sign, and a second single domain LC material having a twist angle with the same magnitude and a negative sign. The magnitude of the twist angle is approximately from 45 to 70 degrees. The first and second LC materials are twisted nematic LC materials or ferroelectric LC materials. The liquid crystal phase gratings operate preferably in a normally-black condition with low operating voltages of below 3 V and high optical diffraction efficiencies. The LC cell is used in reflective or transmissive spatial light modulators of displays.

22 Claims, 9 Drawing Sheets

RED

GREEN

BLUE

POLARIZATION INDEPENDENT LIQUID CRYSTAL PHASE GRATINGS FOR REFLECTIVE SPATIAL LIGHT MODULATORS

BACKGROUND OF THE INVENTION

1. Field of the Invention

The present invention is directed to a polarization independent liquid crystal display using reflective spatial light modulators, and more particularly, to a display having reflective spatial light modulators with liquid crystal phase gratings that exhibit polarization independent diffraction of incident light.

2. Discussion of the Prior Art

Increasingly, cathode ray tube (CRT) displays are being replaced with liquid crystal displays (LCDs). LCDs use spatial light modulators (SLMs) to form images. One type of an LCD is an active-matrix-driven liquid crystal display (AMLCD) that uses SLMs. The SLMs may be either transmissive or reflective.

FIG. 1 shows a basic structure of a display 100 having conventional active-matrix-driven liquid crystal transmissive spatial light modulators (AM LC SLMs). The display 100 has a back polarizer 110 and a front polarizer 115 which faces a viewer. Front and back glass substrates 120, 125 are located between, and next to, the back and front polarizers 110, 115, respectively. The AM LC SLMs, whether transmissive or reflective, typically have repetitive unit cells or picture elements (pixels) 130. FIG. 1 shows 9 pixels in a 3×3 pixel array.

An array of transistors 135, such as field effect transistors (FETs), is formed on the back glass substrates 125. Each FET 135 in the array has its own transparent conductive electrode 140, referred to as a pixel electrode 140. Each FET 135 and pixel electrode 140 are part of one pixel (or subpixel) of an image formed on a screen (not shown) located between a viewer (not shown) and the front polarizer 115 of the display 100. Collectively, the pixel electrodes 140 form an array of pixel electrodes.

On the front substrate 120, a transparent conductive front electrode 145 is formed, which is common to all the FETs 135 in the transistor array. The front electrode 145 is referred to as a counter-electrode. Optional color filters 150 arranged in an array may be formed between the front substrate 120 and the common counter-electrode 145. The color filters include red, green and blue filters, where each pixel has its own filter.

A liquid crystal (LC) medium 155 is sandwiched between the transparent conductive pixel and common counter-electrodes 140, 145. Two alignment layers, i.e., front and back alignment layers (not shown), such as rubbed polyimide films, are formed between the LC medium 155 and the pixel and common electrodes 140, 145, respectively. A back-light source 160 illuminates the back of the display panel 100, where light rays 165 from the back-light source 160 are incident on the back polarizer 110.

Each FET 135 is an on/off transistor switch that supplies a voltage to the pixel electrode 140 in the ON condition. This in turn generates an electric field between the pixel electrode 140 and the common counter-electrode 145. The electric field aligns molecules of the LC medium 155. This alignment causes light passing through the LC medium 155, from the back-light source 160, to form an image a screen (not shown) located between the front polarizer 115 and a viewer (not shown).

Instead of transmissive SLMs, where the pixel electrodes 140 are transparent, reflective SLMs may be used having reflective pixel electrodes. For reflective AM LC SLMs having reflective pixel electrodes, the transparent conductive pixel electrode 140 is replaced with a reflective metal electrode. Each metal pixel electrode of a reflective SLM typically occupies a larger area than a corresponding transparent pixel electrode 140 of a transmissive SLM.

The additional area of the reflective metal pixel electrode covers the FET 135.

For reflective AM LC SLMs, there is no need for the back-light source 160 used with transmissive SLMs. Instead, ambient light or another light source illuminates the display panel from the front of the panel, e.g., from the top or front polarizer 115 shown in FIG. 1. A more detailed description of a display having reflective AM LC SLMs is given in connection with FIG. 8.

FIG. 2 shows an equivalent circuit 200 of one of the pixels 130 shown in FIG. 1. Although FIG. 1 is a display using transmissive SLMs, FIG. 2 is an equivalent circuit 200 for both transmissive and reflective SLMs. A display using reflective SLMs is shown in FIGS. 3 and 4.

As shown in FIG. 2, the gate 205 of the FET 135 is connected to a gate bus line 210, while the FET drain 215 is connected to a data bus line 220. The source 225 of the FET 135 is connected to the pixel electrode 140, which is shown in FIG. 1 as the transparent pixel electrode, and is also shown in FIGS. 3, 4 as a reflective pixel electrode 140'. The LC medium 155 of FIG. 1 is equivalent to a capacitor 230, which has one terminal connected to the pixel electrode 140 and another terminal connected to the common transparent counter-electrode 145.

A storage capacitor 240 provides parallel capacitance to the LC capacitor 230. The storage capacitor 240 is terminated on a common line 260, which is common to all the storage capacitors 240 in the display. Another alternate design for a storage capacitor is to replace the storage capacitor 240 with a storage capacitor 250, which is connected from the pixel electrode 140 to the gate bus line 210.

When a voltage below a threshold voltage is applied on the gate bus line 210, the FET 135 is in an OFF condition (OFF state). The OFF FET 135 acts as an open switch and separates the data bus line 220 from the pixel electrode 140. This isolates the potentials on data bus line 220 and the pixel electrode 140 from each other.

When a voltage larger than the threshold voltage is applied to the gate bus line 210, the FET 135 is turned ON (ON state) and has a low impedance between its source 225 and drain 215. The ON FET 135 acts as a closed switch and connects the data bus line 220 to the pixel electrode 140. This transfers the data voltage on the data bus line 220 to the pixel electrode 140.

In the ON state, varying the data voltage on the data bus line 220 varies the voltage applied to the pixel electrode 140. The different voltages applied to the pixel electrode 140 variably turn on the liquid crystal cell 230. Varying the pixel voltage (on the pixel electrode 140) varies the intensity of light as it passes through the liquid crystal cell 155 shown in FIGS. 1, 3, 4, and represented as the LC capacitor 230 in FIG. 2. This results in displaying different scales of gray color on a screen (not shown) located between a viewer (not shown) and the front polarizer 115 shown in FIG. 1.

FIGS. 3 and 4 show cross sectional and perspective views of a conventional reflective display 300 using an array of reflective liquid crystal spatial light modulators (LC SLMs). The array of FETS 135 are formed on the substrate 125, which is a silicon (Si) wafer, for example. Each FET 135 drives one of the reflective SLMs in the SLM array as described below.

FIG. 3 is a cross sectional view of a single reflective liquid crystal light valve or SLM of the conventional reflection liquid crystal (LC) display 300. The FET 135 is formed between field oxide regions 305 on the semiconductor Si substrate 125. The field oxide regions 305 separate the FET 135 from other FETs or devices formed on the substrate 125. The FET 135 has source and drain regions 225, 215 which are formed in the substrate 125. The source and drain regions 225, 215 are separated by a channel region 310.

Over the channel region 310, a gate insulating film 315 is formed. Illustratively, the gate insulating film 315 is an $SiO_2$ layer having a thickness which is approximately from 150 to 500 angstroms (Å). A polysilicon gate electrode 205, e.g., having a thickness of approximately 0.44 micron ($\mu$), is formed over the gate insulating film 315.

A layer of dielectric or insulator material, such as an $SiO_2$ layer 320, is formed over the FET 135 and field oxide regions 310. The storage capacity line 260, also shown in FIG. 2, is formed over a portion of the $SiO_2$ layer 320 so that the storage capacity line 260 extends over portions of the source 225 and the field oxide regions 305 adjacent thereto. A second $SiO_2$ layer 325 is formed over the storage capacity line 260 and exposed portions of the first $SiO_2$ layer 320. The two $SiO_2$ layers 320, 325 act as inter-layer insulating films.

First and second via holes are formed extending through both $SiO_2$ layers 320, 325 to expose portions of the source and drain regions 225, 215, respectively. A conductive source line 330 and the conductive data bus line 220, which is also shown in FIG. 2, are formed in the first and second via holes, respectively. The conductive source and data lines 330, 220 extend over portions of the second $SiO_2$ layer 325 and are electrically connected to the source and drain regions 225, 215, respectively. Illustratively, the source and data lines 330, 220 are aluminum (Al) and have a thickness 335 of approximately 0.7 microns.

A third silicon oxide $SiO_2$ film 340, acting as an inter-layer insulating film, is formed over the source and data lines 330, 220 and exposed portions of the second silicon oxide $SiO_2$ layer 325. Over the third oxide $Sio_2$ layer 340, an optical absorbing layer 345 is formed. The optical absorbing layer 345, which has a thickness of approximately 160 nano-meters (nm), is formed of three layers that are laminated over each other in the following order: A titanium (Ti) layer having a thickness of approximately 100 Å; an aluminum (Al) layer having a thickness of approximately 1000 Å; and a titanium nitride (TiN) layer having a thickness of approximately 500 Å.

Laminating these three layers so as to form the optical absorbing layer 345 with a thickness of approximately 160 nm, reduces reflection of light, e.g., having a wavelength from 345 to 700 Å, that enters the optical absorbing layer 345 to result in a reflection factor of approximately 25%. The light that enters the optical absorbing layer 345 is shown as arrow 350 in FIG. 3.

In addition, the optical absorbing layer 345 prevents the light 350 from being transmitted to the FET 135 to result in a transmission factor of approximately 0%. The optical absorbing layer 345 improves contrast of images and prevents leakage currents in the FET 135.

A silicon nitride film 355, having a thickness of approximately from 400 to 500 nm, is formed on the optical absorbing layer 345. Next, an Al light reflecting film 140' having a thickness of approximately 150 nm, also shown in FIG. 2 as reference numeral 140 and referred to as the pixel electrode, is formed over the silicon nitride film 355.

A via hole is formed to expose a portion of the source line or electrode 330 of the FET 135. The via hole penetrates through the light reflecting film or pixel electrode 140', the silicon nitride film 355, the optical absorbing layer 345, and the third silicon oxide $SiO_2$ film 340.

A conducting stud, 360, such as a tungsten (W) stud is formed in the via by a chemical vapor deposition CVD method, for example. The tungsten stud 360 electrically connects the source line or electrode 330 to the light reflecting film or pixel electrode 140'. To prevent electrical connection to the tungsten stud 360, the optical absorbing layer 345 is removed from around the tungsten stud 360.

As more clearly shown in the perspective view of the display 300 in FIG. 4, the light reflecting film or pixel electrode 140' is separated from adjacent pixel electrode 140'. Illustratively, the reflective pixel electrode 140' are spaced apart from each other at a specified interval of about 0.5 to 1.7 microns. Each reflective pixel electrode 140', along with its associated FET 135, form a subpixel. For example, three subpixels for red, green and blue components of light form a pixel.

At selected locations of the array of subpixels, pillar-shaped spacers 365 are formed in the space that separates the reflective pixel electrodes 140' from each other. Illustratively, the pillar-shaped spacers 365 are $SiO_2$ spacers having a width 370 of approximately 1 to 5 microns. The height 375 of each spacer 365 is determined according to the desired cell gap, which is filled with the liquid crystal (LC) 155. The spacers 365 are provided throughout the substrate at specified intervals in order to retain the desired cell gap or thickness d of the LC material 155.

Note, the width 370 of each spacer 365, which is about 1–5$\mu$, is the same order as the distance of about 0.5–1.7$\mu$ that separates the reflective pixel electrode 140'. This provides minimum overlap of the spacers 365 with the reflective pixel electrode 140', which in turn minimizes any reduction of the numerical aperture of each subpixel resulting from the pillar-shaped spacer 365.

The counter-electrode 145, which is formed on the glass protect substrate 120, is attached over the spacers 365. The counter-electrode 145 and glass substrate 120 are also shown in FIG. 1. The glass protect substrate 120 is the front portion of the display 300, i.e., the portion facing a viewer. As described in connection with FIG. 1, the counter-electrode 145 is transparent and common to all the pixels. Illustratively, the counter-electrode 145 is an indium titanium oxide (ITO) transparent electrode.

Attaching the counter-electrode 145 over the pillar-shaped spacers 365 forms the cell gap. The liquid crystal (LC) layer 155, in which a liquid crystal material is sealed, is formed in the cell gap between the light reflecting film or pixel electrode 140' and the counter-electrode 145. Orienting films (not shown) are also formed over the pixel electrode 140' and the counter-electrode 145 to orient the liquid crystal molecules.

Illustratively, as shown in FIG. 4, each pixel electrode 140', which defines a subpixel, has a square shape with a side of approximately 17 microns. To form the display 300, the subpixels are arranged in a matrix or array of 1280 rows and 1600 columns, for example.

In the reflective liquid crystal light valve or SLM, comprising the LC material 155 sandwiched between the common transparent ITO counter-electrode 145 and the reflective pixel electrode 140', light 350 entering from the glass protect substrate 120 reflects from the reflective pixel electrode 140'. The pixel electrode 140' also functions as a display electrode for applying a voltage to the liquid crystal layer 155. The FET 135 functions as a switching element for providing a signal voltage from the data line 220 to the pixel electrode 140', when a control voltage on the gate 205 turns on the FET 135, as described in connection with FIG. 2.

An image is projected, from the front glass substrate 120, onto a screen (not shown) located between a viewer (not shown) and the front glass substrate 120, when the light 350 that enters the front glass protect substrate 120 travels through LC material 155 and reflects back to the front glass substrate 120. This light is reflected from the reflective pixel electrode 140'. Depending on the voltage of the pixel electrode 140', which voltage affects alignment of the LC material 155, the light reflected from the reflective pixel electrode 140' either exits the front glass protect substrate 120, e.g., to form an image on the screen, or is blocked by an analyzer (not shown) from reaching the screen.

The light polarization rotating properties of the LC material 155 results from varying the direction of the liquid crystal molecules (not shown) in accordance to a voltage applied between the reflective pixel electrode 140' and the transparent ITO common counter-electrode 145. As described in connection with FIG. 2, this voltage is supplied from the data bus line 220 to the pixel electrode 140' when the FET 135 is turned on in response to a control signal on the gate bus line 210 (FIG. 2), which is connected to the gate 205 of the FET 135.

Depending on the voltage applied to the pixel electrode 140', the directors' orientation of the LC material 155 changes. This varies the state of the polarization of light that is incident on the pixel electrode 140', that reflects therefrom, and that exits the front glass protect substrate 120. Based on this variation of the state of light polarization, an image is formed on a screen located between the front glass protect substrate 120 and a viewer, as further described in connection with FIG. 8.

According to the prior art, the LC medium 155 used in reflective spatial light modulators (SLMs) requires either a linearly-polarized or randomly polarized incident light 350. The requirement of a polarized incident light results in a poor optical through-put, because more than half of the incident light is absorbed or rejected by the polarizer 110 (FIG. 1), which is located over the front glass protect substrate 120. That is, only one of the vertical or horizontal polarizations of light is used thus limiting the display efficiency to a theoretical maximum of 50%.

To increase the display or SLM efficiency, both vertical or horizontal polarizations of light are used. In this case, the LC medium 155 has been used in polarization independent LC devices based on scattering or diffraction. This allows the entire input intensity of both orthogonal horizontal and vertical polarizations of light to be used.

One typical example of scattering LC SLMs or light valves used in displays is referred to as a polymer-dispersed liquid crystal. However, polymer-dispersed liquid crystal light valves cannot operated below 4 volts (V). In addition, the polymer-dispersed liquid crystal has a large hysteresis as seen from plots of transmission or reflection versus voltage. Thus, a full-color display cannot be realized by using polymer-dispersed liquid crystal.

Instead of scattering LC SLMs, the other approach to achieve a polarization independent light valve having LC material uses light diffraction effect of LC phase gratings.

Diffractive light valves using LC material have been previously proposed. These proposed prior art SLMs use nematic LC mixtures with positive dielectric anisotropy. In addition, the LC molecules adjacent to the cell substrates are in homogeneous, i.e., parallel, alignment.

One such proposal of an LC grating design, based on field-induced tunable birefringence, is described in Y. Hori, K. Asai, "Field Controllable Liquid-Crystal Phase Grating", IEEE Trans. Elec. Dev. Vol. 26, pp. 1734–1737 (1979), hereinafter referred to as Hori. However, the Hori configuration requires the use of polarizers which lower the transmission of light.

The LC light valve proposed by Hori uses an untwisted LC material which has polarization dependent performance and requires high voltage to achieve high contrast. In addition, the Hori proposed LC light valve also requires interdigitated electrodes within each pixel, resulting in increased possibility of shorts and undesired interconnections across electrodes.

Other proposals have investigated polarization independent LC gratings. One such proposal is disclosed by M. Fritsch, H. Wohler, G. Haas, D. Mlynski, "Liquid Crystal Phase Modulator for Large Screen Projection", IEEE Trans. Elec. Dev. Vol. 36, pp. 1882–1887 (1989), hereinafter referred to as Fritsch. Fritsch proposed an LC light valve using a 90° and a 180° twisted LC material. However, the Fritsch light valve demonstrated only about a 0.5 π (i.e., 90°) phase difference between ON and OFF states. The result is a reflective light valve based on field-controlled birefringence difference between alternating strips inside each pixel.

All the above approaches have the further disadvantage that electrodes are required to be patterned with high resolution.

To avoid the use of the interdigitated electrodes, the use of pattern alignment to generate phase gratings has been suggested in W. Gibbons, P. Shannon, S. Sun, B. Swetlin, "Surface-Mediated Alignment of Nematic Liquid Crystals with Polarized Laser Light", Nature Vol. 351, pp. 49–501991), hereinafter referred to as Gibbons. Because the differently patterned domains of the LC material requires no separation, diffraction efficiency is increased and the risk of shorts between electrodes is reduced.

Other proposals have demonstrated the use of pattern alignment with an optically active device for transmissive SLMs. One such proposal is disclosed in P. Bos, J. Chen, J. Doane, "An Optical Active Diffractive Device for a High Efficient Light Valve", SID 95 DIGEST, pp. 601–604 (1995), hereinafter referred to as Bos. Bos proposed several schemes. The first scheme is an LC diffractive light valve based on a two domain tunable birefringence (TD-TBD) light valve.

FIG. 5 shows a top view of the LC material of one pixel of the Bos TD-TBD light valve 400. The Bos TD-TBD light valve has alternating strips 410, 420 of tunable birefringence LC material. The projections of the LC material's optical axes or directors 430 of one strip 410 are orthogonal to the directors 430 of adjacent strips 420. The alternating strips 410, 420 are formed by patterning the alignment layer of the LC medium, which alignment or orienting layer is formed on the pixel electrode 140, for example.

The TD-TBD LC phase gratings that have alternating strips, which are also referred to as Freedericksz domains, are "No-Twist" gratings. Within each Freedericksz domain, the LC directors are aligned uniformly across the cell substrates. For example, in the strip referenced by numeral 410 in FIG. 5, all the LC directors 430 are vertical, while all the LC directors 430 in the strip referenced by numeral 420, which is adjacent to the first strip 410, are horizontal.

When the devices have a voltage applied such that the effective value of $d\Delta n/\lambda$ is a multiple of a ½, then all polarizations of light is diffracted. However, if $d\Delta n/\lambda$ is 0 or a multiple of 1, then no diffraction occurs. Note that d, which is shown in FIG. 3, is the cell gap or the thickness of the LC material 155; $\lambda$ is the wavelength of incident light 350; and $\Delta n$ is optical refractive index anisotropy or birefringence of the LC material 155. In particular, $\Delta n$ is the difference in the refractive indices of the LC material 155 for extraordinary light $n_e$ (e.g., horizontal polarization) and ordinary light $n_o$ (e.g., vertical polarization) ; $\Delta n = n_e - n_o$. When $\Delta n$ is positive, then the LC material is referred to as having positive birefringence. Similarly, when $\Delta n$ is negative, then the LC material is referred to as having negative birefringence.

A problem with the Bos TD-TBD no-twist grating light valve is that when the LC material has positive dielectric anisotropy and the device is switched between 0 and ½ wave, the voltage required to get to zero retardation is undesirably high, such as above 5 volts.

The second light valve described by Bos is a two-domain 90° twisted nematic (TDTN) phase grating, with adjacent domains being twisted opposite to each other. That is, adjacent domains alternate between a positive and a negative twist angle. However, the magnitude of the twist angle of each domain, excluding the direction or sign of the twist angle, is 90°.

FIG. 6 shows a liquid crystal (LC) configuration 500 of LC directors 510 in two adjacent strips 520, 530 of a conceptual device described in Bos. The magnitude of the twist angle of each strip 520, 530, is 90°. One strip 520 has a left handed twist, e.g, having a positive sign, for a twist angle of +90° shown as arrow 540, arid the other strip 530 has a right handed twist, e.g, having a negative sign, for a twist angle of -90° shown as arrow 550. A reference axis 560 along the cell gap thickness d is shown in FIG. 6.

FIG. 7 shows light waves 610, 620 propagating through the two strips 520, 530 of the conceptual device 500 of FIG. 6. As shown in FIG. 7, both the polarization and the phase of the light waves 610, 620 change as they propagate through the LC of the device 500. The polarization of the incident light waves 610, 620 changes from vertical to horizontal polarization.

Because the two strips 520, 530 are twisted 90°, the light waves 610, 620 exit the strips 520, 530 each rotated by 90°. However, since the 90° twist of the two strips 520, 530 are in opposite directions, i.e., +90° for one strip 520 and -90° for the other strip 530, the light waves 610, 620 exit the strips 520, 530 with opposite polarizations. This results in two light waves 610, 620 being 180° out of phase as they exit the strips 520, 530 of the LC conceptual device 500.

In TDTN phase gratings, if $d\Delta n/\lambda$ is chosen to satisfy the condition that $d\Delta n/\lambda = \sqrt{n^{2-0.25}}$, where n is an integer, then all polarizations of light passing through the LC material is diffracted.

Using TDTN phase gratings, a transmissive light valve with high contrast and relatively low-operating voltage has been demonstrated. However, while the optical diffraction efficiency for transmissive TDTN phase grating can be high, approaching 100%, nevertheless the diffraction efficiency is below 35% when used as a reflective (instead of transmissive) LC phase grating. It is desirable to lower the operating voltage of reflective LC phase gratings to around 3 volts or lower. However, a reflective TDTN LC phase grating cannot operate at 3 volts or lower.

The third light valve described by Bos is an orthogonal-twist two-domain TN (OTTDTN) having alternating TN domain strips. The alternating TN domain strips within each pixel have identical twist direction. The rub direction to align the LC medium in one domain is perpendicular to that of the other domain at the front and back surfaces of the LC cell. For example, one strip has a twist angle from 0° to +90°, while the other strip has a twist angle from +90° to +180°. In comparison, in the second light valve described by Bos having the two-domain 90° twisted nematic (TDTN) phase grating, one strip has a 0° to +90° twist angle, while the other strip has a 0° to -90° twist angle.

Although reflective OTTDTN LC phase gratings have a better optical diffraction efficiency than that of reflective TDTN phase gratings, the operating voltage of the OTTDTN is similar to the operating voltage of the TDTN and is unlikely to be lower than about 3.4 volts.

In using polarization-independent LC phase gratings, except for rare cases where the incident light is monochromatic and the LC cell gap is uniform with negligible deviation from a design value, it is difficult to make the non-diffracted light vanishingly small. If the non-diffracted light is collected as a signal to form the image, it is important to make the non-diffracted light vanishingly small because one of the ON or OFF states of the SLM has to be a dark state of the display. Therefore, collecting the non-diffracted light to represent a signal results in poor contrast. Accordingly, for illustrative purposes, the following description of the present invention concerns only the case of collecting diffracted light as a signal that forms an image. However, it is understood that non-diffracted light may also be collected as a signal to form an image.

Both the second and third type of light valves described by Bos, i.e., the TDTN and OTTDTN gratings, are diffractive at zero volt and less diffractive at higher voltages. Such devices are called normally-white diffractive (NWD) gratings in the case where the diffracted light is collected to represent a signal. There are other types of LC phase gratings, typically referred to as normally-black diffractive (NBD) gratings, that do not diffract light at zero volt and becomes more diffractive as the applied voltage increases.

Bos only proposed NWD LC phase gratings without any mention of the NBD LC phase gratings. The Bos proposed NWD gratings are either unsuitable for reflective SLMs or have an operating voltage which is higher than about 3 volts. That is, the Bos proposed NWD gratings cannot operate at voltages below about 3 volts.

Reflective SLMs have been used for projection displays. FIG. 8 shows a typical optical system 700 having three reflective SLMs 705, 710, 715 which use LC phase gratings to render the reflective SLMs 705, 710, 715 into polarization independent devices.

Light is emitted from a lamp 720 having a reflector 725. The emitted light passes through a relay lens 730, and is reflected by a mirrored bar (louvers) system 735 toward crossed dichroic filters 740, 745. Red, green, and blue components of the light are separated by the crossed dichroic filters 740, 745, and are directed toward the reflective SLMs 705, 710, 715, respectively. Schlerien lenses 750, 755, 760 are located between the SLMs 705, 710, 715, and the dichroic filters 740, 745, respectively. The Schlieren lenses 750, 755, 760 image each color components of the incident light onto and out of the corresponding SLMs 705, 710, 715.

For the case of NBD modes, if the LC phase grating of each reflective SLM 705, 710, 715 is not activated, the incident red, green, and blue lights are not diffracted by the LC material of the SLM 705, 710, 715. After being reflected back from the corresponding SLM 705, 710, 715, the red, green, and blue component of light are imaged by the corresponding Schlieren lenses 750, 755, 760 and are recombined by the crossed dichroic filters 740, 745. The recombined light from the dichroic filters 740, 745 are reflected by the mirrored bar system 735 back toward the relay lens 730.

Because the LC phase grating of each reflective SLM 705, 710, 715 is not activated, almost no light reflected from the SLMs 705, 710, 715 passes through the mirrored bar system 735. Thus, this light reflected from the SLMs 705, 710, 715 is not directed to a projection lens 765 located between the mirror bar 735 and a screen 770. This inactivated state of the SLM 705, 710, 715 represents the dark state of the display 700.

The bright state of the display occurs when the LC phase grating in each reflective SLM 705, 710, 715 is activated. In this bright state, light incident on the reflective SLMs 705, 710, 715 from the lamp 720 is diffracted. Most of the light reflected from the reflective SLMs 705, 710, 715 passes through the mirrored bar system 735 and is projected by the projection lens 765 onto the display screen 770 to illuminate a pixel 775 thereon.

For the NWD modes, the fully activated state of the SLMs 705, 710, 715 of FIG. 8 represents the nondiffractive state, so that the screen 770 appears dark. The fully diffractive state occurs in the quiescent state, where the SLMs are not activated, i.e., the FETs are not turned ON. In this quiescent or fully diffractive state, the screen 770 appears bright.

The present invention relates to polarization independent LC phase gratings that are fabricated into reflective SLMs e.g., for projection displays, such as the display 700 shown in FIG. 8.

SUMMARY OF THE INVENTION

The object of the present invention is to provide a liquid crystal (LC) cell having polarization independent liquid crystal phase gratings that eliminate the problems of conventional LC cells.

Another object of the present invention is to provide an LC cell that operates at voltages below 2.55 volts.

A further object of the present invention is to provide an LC cell that has a high diffraction efficiency.

A still further object of the present invention is to provide an LC cell that does not require high resolution patterning of pixel electrodes.

The present invention accomplishes the above and other objects by providing a liquid crystal (LC) cell having LC phase gratings comprising alternating strips of a first single domain LC material having a twist angle with a magnitude and a positive sign, and a second single domain LC material having a twist angle with the same magnitude and a negative sign. The magnitude of the twist angle is approximately from 45 to 70 degrees. The first and second LC materials are twisted nematic LC materials or ferro-electric LC materials.

The LC material has either positive or negative dielectric anisotropy. For a positive or negative dielectric anisotropy, the preferred magnitude of the twist angle is approximately 54 degrees. In addition, a parameter dΔn is from approximately 0.42 μm to approximately 0.65 μm, where d is a cell gap and Δn is birefringence of the LC medium or material. Preferably, dΔn is approximately 0.52 μm.

For an LC material with negative dielectric anisotropy, the preferable magnitude of the twist angle is approximately 63.6 degrees. In addition, dΔn is from approximately 0.16 μm to approximately 0.24. Preferably, dΔn of approximately 0.2 μm.

The LC cell may be used in a display having either transmissive and reflective spatial light modulators (SLMs). The LC cell of the SLM is sandwiched between two electrodes that provide an electric field across the LC cell.

The LC cell has, for example, polarization independent nematic LC phase gratings based on diffraction effect. The light diffraction effect is caused by LC phase gratings made of pattern-aligned two-domain nematic LC cells with opposite twist for each adjacent domain. The LC phase gratings are preferably operated in a normally-black condition, for example, with a low operating voltage, such as below 3 V, and a high optical diffraction efficiency. Preferably, the LC phase gratings are used in reflective spatial light modulators of displays.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 9:
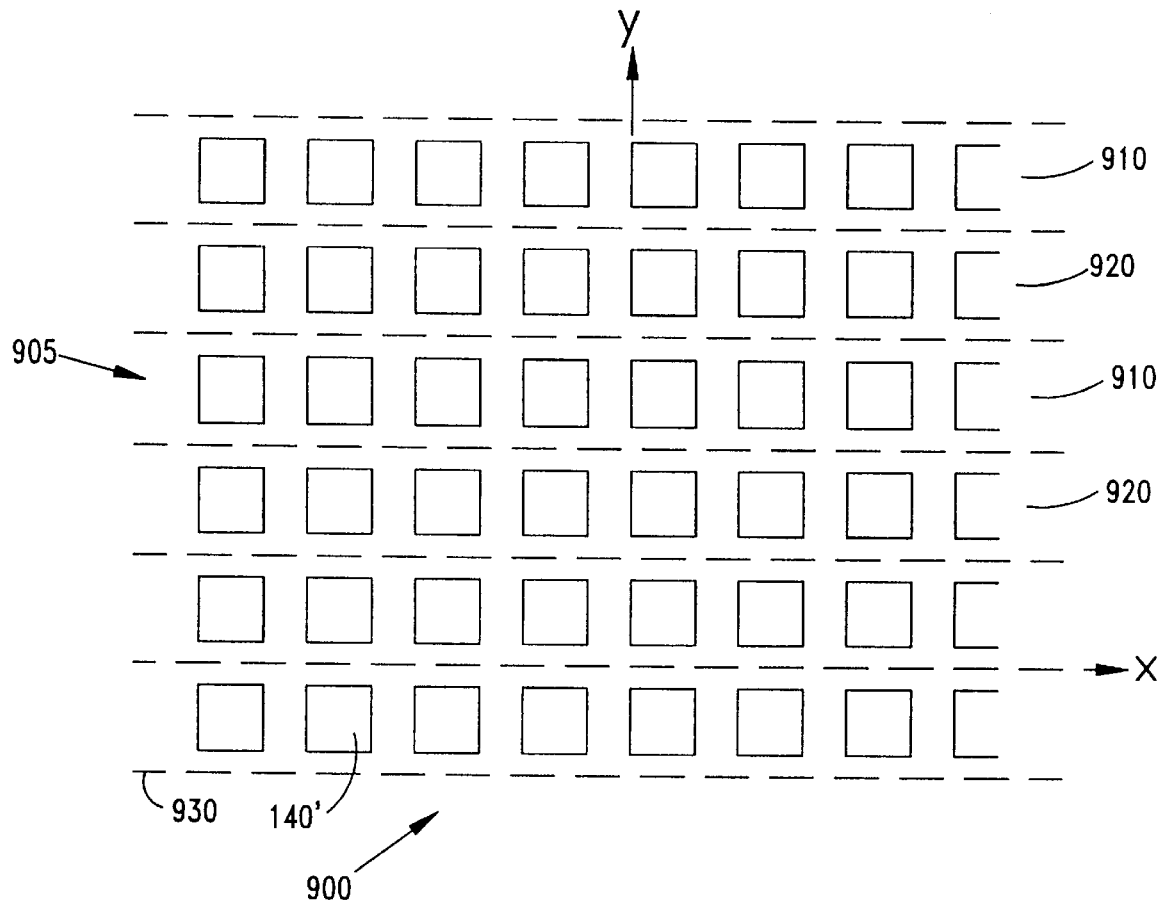
FIG. 9 shows a top view of LC phase gratings having an array of reflective pixel electrodes upon which LC material is formed according to the present invention.

FIG. 9 shows a top view of an array 900 of retlective pixel electrodes 140' upon which the LC material 905 is formed. The LC material 905 is a twisted nematic LC material and has LC phase gratings comprising alternating patterned strips 910, 920. The twisted nematic LC material are aligned to have opposite signs or directions of the twist angle on adjacent strips 910, 920.

Dashed lines 930 form the boundary between two adjacent domains or strips 910, 920 of the twisted nematic LC material 905. The two alternating parallel strips 910, 920 that have opposite twist angles are of approximately equal width.

There are numerous choices for the width of the strips 910, 920, that range from p/n to np, where n is a integer and p is the pitch of the pixel electrodes 140' on the reflective SLM. The simplest case is n=1, where the width of the strip 910, 920 is equal to the pitch of the pixel electrodes 140'.

Figure 1:
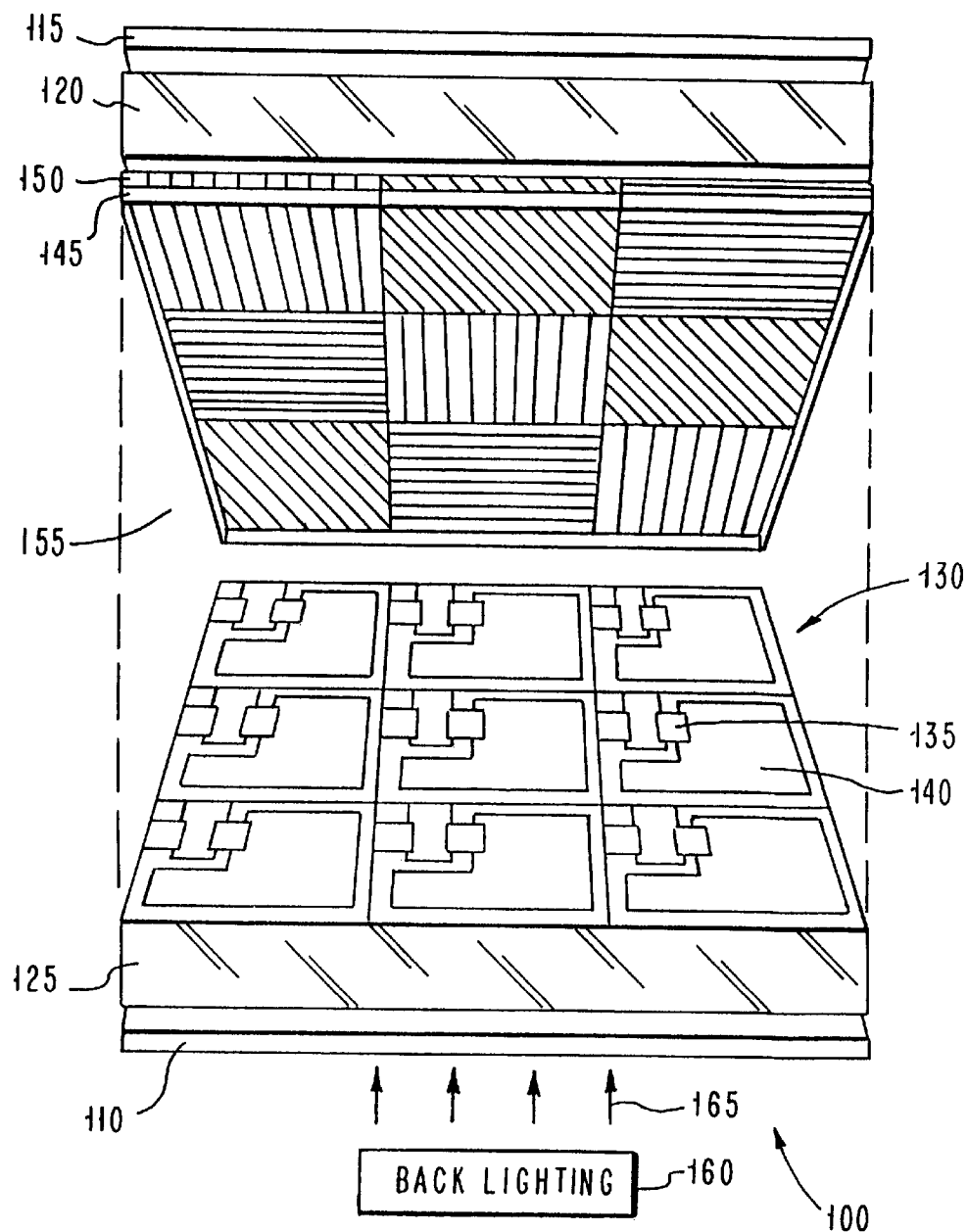
FIG. 1 shows a conventional liquid crystal display (LCD) having transmissive spatial light modulators (SLMs)
Figure 1:
Figure 1:
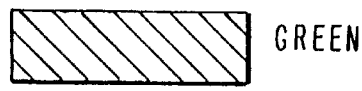
Figure 1:
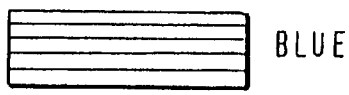
Figure 2:
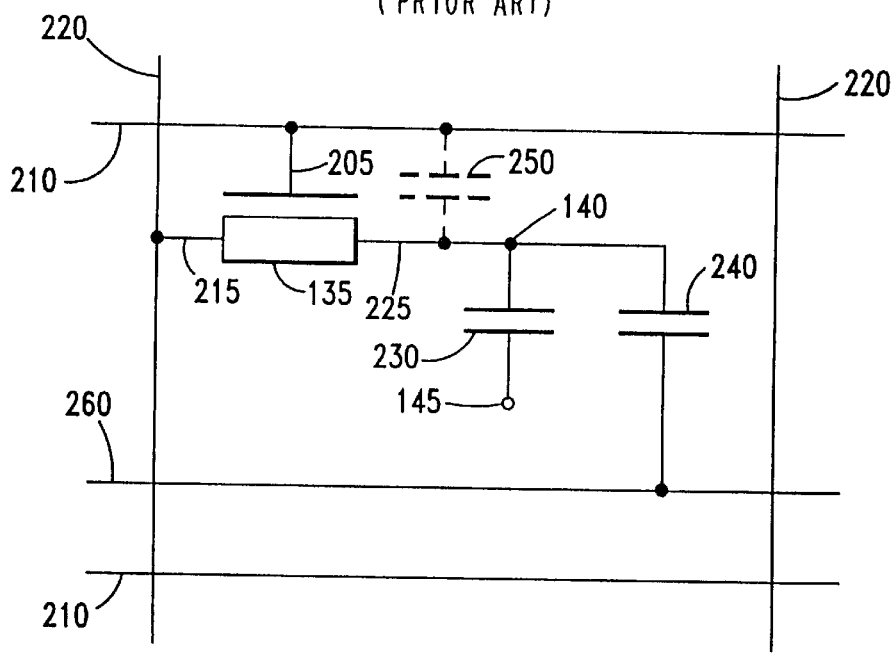
FIG. 2 shows an equivalent circuit of a pixel of the conventional LCD shown in FIG. 1.
Figure 3:
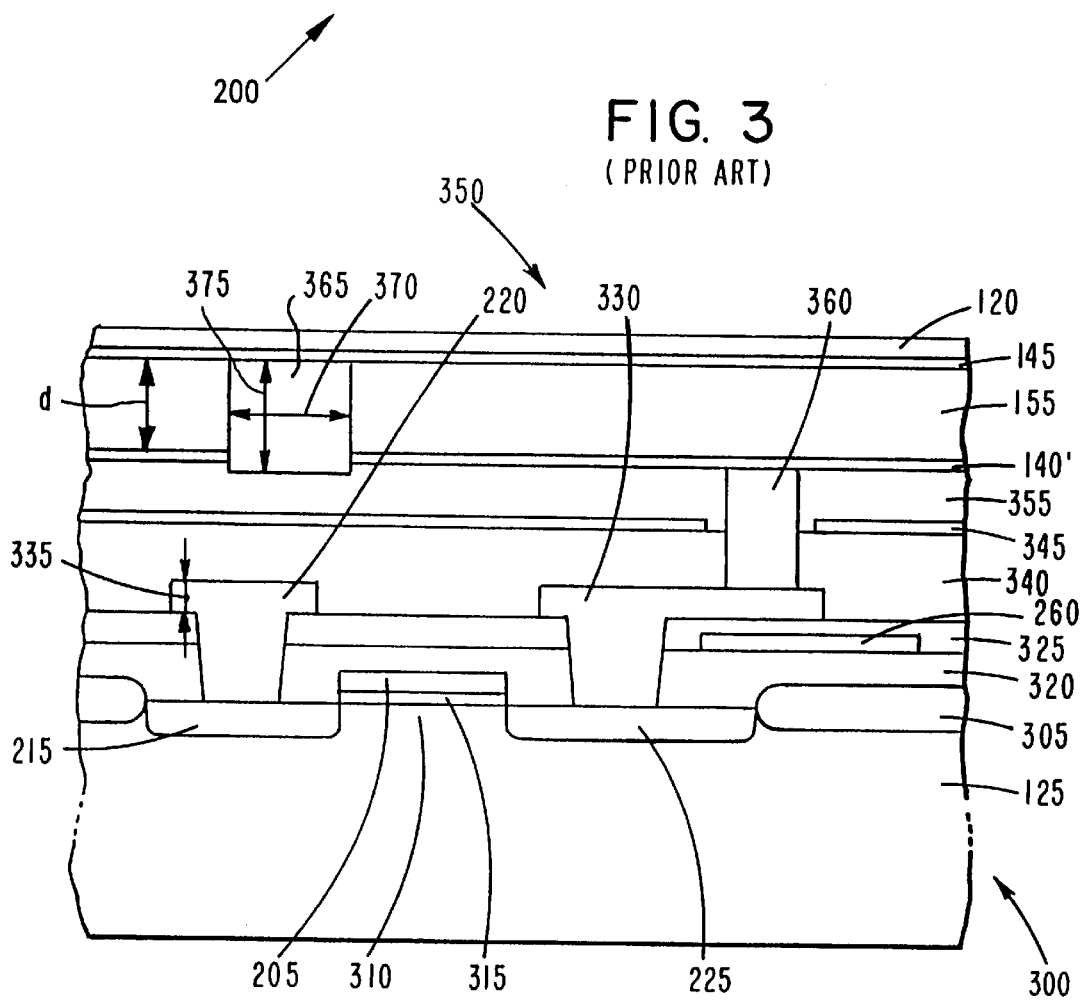
FIG. 3 shows a cross sectional view of a single reflective liquid crystal light valve or SLM of a conventional reflective LCD.
Figure 4:
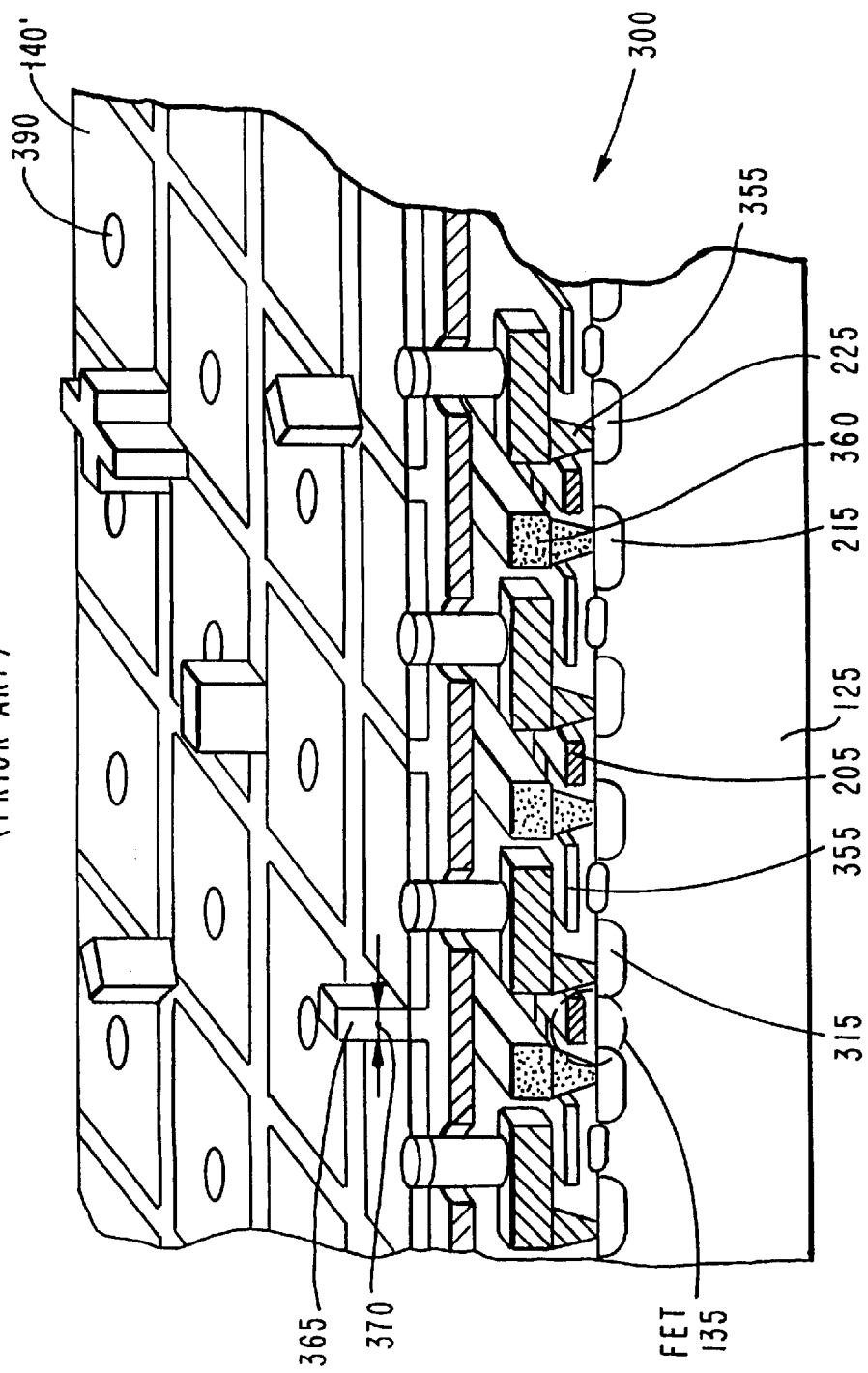
FIG. 4 is a perspective view of the conventional reflective LCD shown in FIG. 1 showing an array of the reflective liquid crystal (LC) SLMs.
Figure 5:
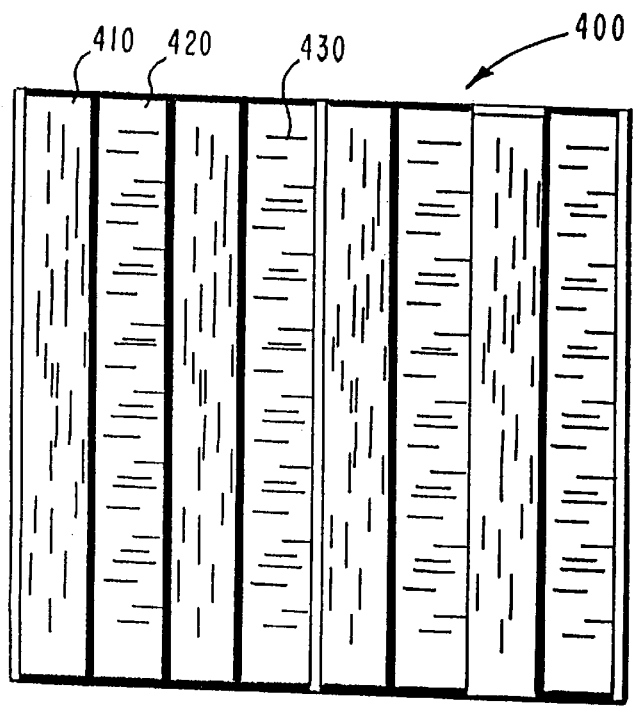
FIG. 5 shows a top view of the LC material of one pixel of a conventional two domain tunable birefringence (TD-TBD) light valve.

Illustratively, the alternating strips of LC domains 910, have a left-handed twist of angle $\Phi$, where the sense of the twist angle is from the reflective pixel electrode 140' of the SLM toward the transparent ITO counter-electrode 145 on the top glass 120 of the SLM shown in FIG. 3. The strip of the LC domains 920, that are adjacent to the left-handed twist LC domains 910, have a right-handed twist of angle $\Phi$. That is, the twist sense of the left-handed twist domain 910 is opposite to that of right-handed twist domain 920. An x,y coordinate is shown in FIG. 9 for reference.

In order to determine the electro-optical properties of a single-domain twist nematic cell, two important parameters are needed: the twist angle $\Phi$ and the $\Delta dn/\lambda$; where d, $\Delta n$ and $\lambda$ are the cell gap, the birefringence of the LC medium, and the wavelength of the incident light, respectively.

Using Jones matrix, the non-diffracted optical intensity $I_o$ for the two-domain opposite twist (TDOPT) LC phase gratings is expressed by equation (1) as follows:

$$I_o = [(\Phi/\gamma)^2 + (\beta/\gamma)^2 \cos 2\gamma]^2 + (\beta/\gamma)^2 (\sin 2\gamma)^2 \quad (1)$$

where $\beta = \pi d \Delta n/\lambda$ and $\gamma = \sqrt{\Phi^2 + \beta^2}$.

The diffracted intensity $I_d$ for the TDOPT LC phase gratings is given by equation (2) as follows:

$$I_d = [(1-\cos 2\gamma)\Phi\beta/\gamma^2]^2 \quad (2)$$

To achieve a high optical diffraction efficiency for the normally white diffractive (NWD) LC phase grating, equation (1) is set to zero, i.e., $I_o=0$. The parameters for LC cell that yield $I_o=0$, is obtained by setting equation (1) to zero, and solving for the LC cell parameters as follows:

$$\gamma = (n+0.5)\pi, \text{ and } \beta = \Phi = 0.7071\gamma. \quad (3)$$

Figure 7:
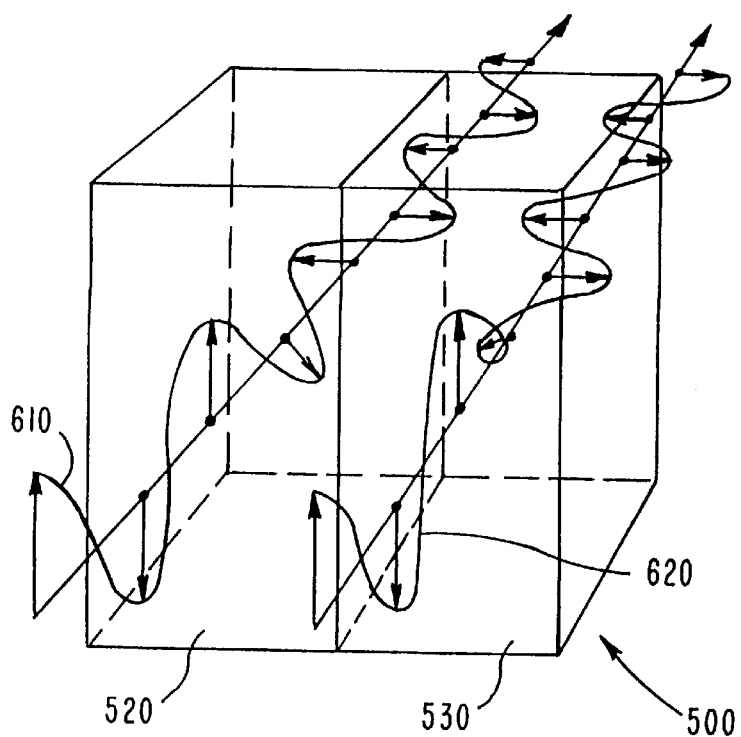
FIG. 7 shows light waves propagating through the two strips of the conventional conceptual device shown in FIG. 6.
Figure 8:
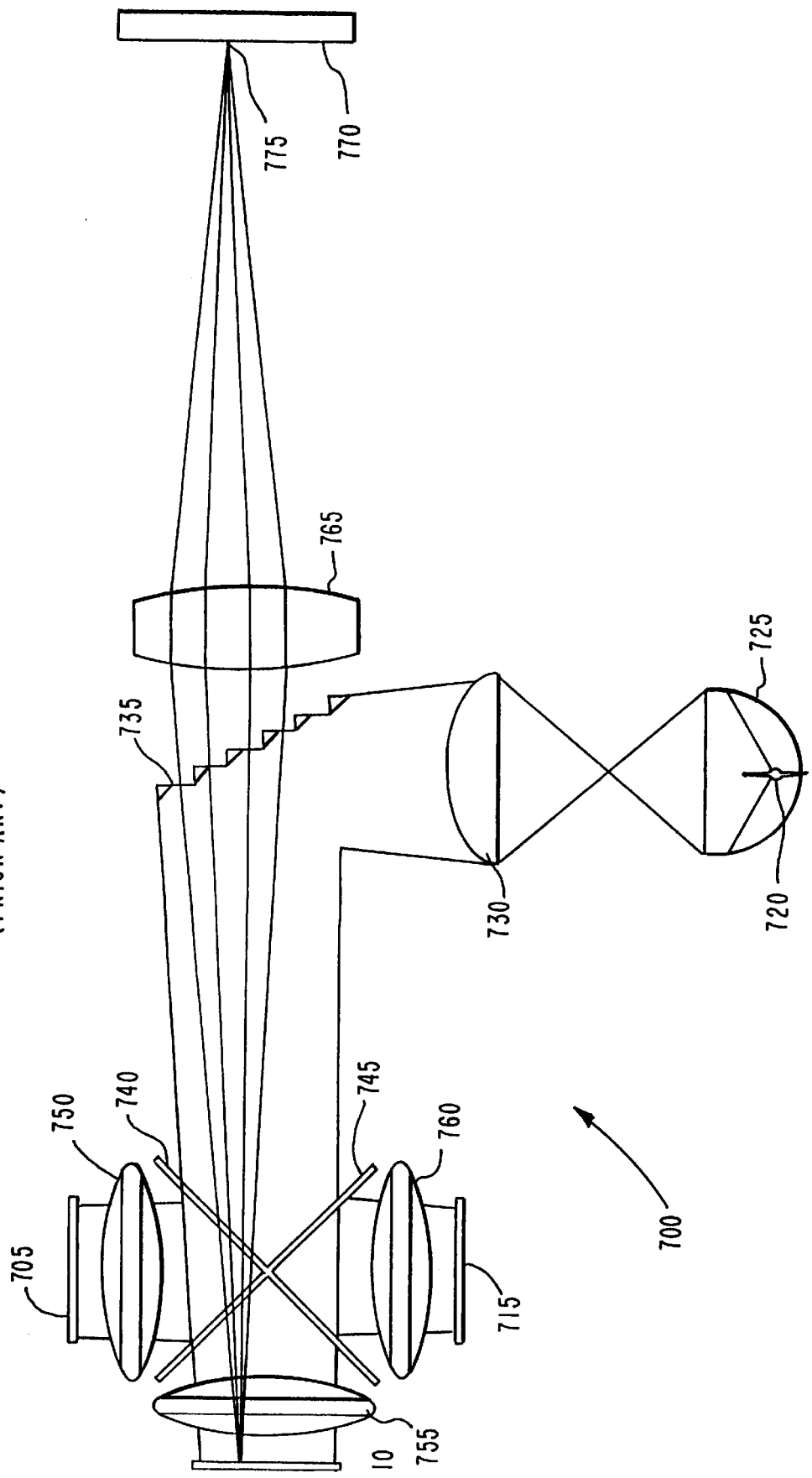
FIG. 8 shows a conventional optical system having three reflective polarization independent SLMs with LC phase gratings.

From the law of conservation of energy, $I_o=0$ implies that $I_d=1$. As shown in FIG. 7, in the case $I_d=1$, the polarization of incident light 610, 620 is rotated exactly 90° and -90°, respectively, by the two adjacent domains 520, 530 that have opposite twist angles of 90° and -90°, respectively.

According to equation (3), there are multiple cases that result in $I_d=1$ depending on the value on integer n. However, except for n=0, the other cases have a twist angle larger than 180° and a large $d\Delta n$ so that the LC cell will have very long response times.

Accordingly, a suitable solution for equation (3) is when n=0. The LC cell is completely diffractive in the quiescent or OFF state state, and becomes less diffractive as the applied electric field exceeds a threshold value. Note, the electric field is applied across the LC cell by applying a voltage on the pixel electrode 140' to result in a potential difference between the pixel electrode 140' and the ITO counter-electrode 145 shown in FIG. 3.

The completely diffractive LC cell in the quiescent state, is in a normally white diffractive(NWD) mode. This NWD mode has 100% diffraction efficiency, low twist angle of less than 65°, and a thin cell gap (small d) that result in short response times.

Despite these advantages, this NWM mode is not practical because of high operating voltages. The disadvantage of the high driving voltage is due to the residual birefringence effect caused by the hardly deformed LC layer boundaries that are adjacent to the counter-electrode 145 and the pixel electrode 140' shown in FIG. 3.

From equation (3), it is seen that the diffraction efficiencies of other two-domain opposite-twisted NWD LC phase gratings with a twist angle equal to or less than 90° are less than 100%. The device parameters $d\Delta n/\lambda$, driving voltage and optical efficiency, $I_d(\max)$, for different twist angles $\Phi$ are listed in Table I for both the NWD and normally black diffractive(NBD) modes.

TABLE I

| $\Phi$ | $d\Delta n/\lambda$ | mode | $I_d$ (max.) | Voltage |
|---|---|---|---|---|
| 0.5 π | 0.355 | NWD | 69.4% | 3.4V |
| 0.5 π | 0.866 | NBD | 33.0% | 2.2 |
| 0.3536 π | 0.354 | NWD | 100% | >5 |
| 0.3536 π | 0.935 | NBD | 91.8% | 2.4 |
| 0.3 π | 0.36 | NWD | 94.9% | >5 |
| 0.3 π | 0.954 | NBD | 99% | 2.4 |
| 0.25 π | 0.365 | NWD | 81.4% | >5 |
| 0.25 π | 0.968 | NBD | 93.5% | 2.5 |

As shown in Table I, the 90° (or 0.5 π) TN phase gratings has low driving voltages; of 3.4 volts for the NWD mode, and 2.2 volts for the NBD mode. For the NWD mode, although the 90° TN phase grating has a low driving voltage of 3.4 volts, as compared to greater than 5 volts for twist angles smaller than 90°, the optical diffraction efficiency of 69.4% is low. Similarly, the desirable low driving voltage of 2.2 volts, for the 90° (0.5 π) twist angle NBD mode is offset by an undesirably low optical diffraction efficiency of 33%. Thus, for nematic LCs having a twist angle magnitude of 90°, as proposed by Bos, have undesirably low optical diffraction efficiencies. Therefore, the TDTN and OTTDTN LC phase gratings proposed by Bos do not have high optical diffraction efficiencies.

In the NBD mode, the liquid crystal material is configured to be non-diffractive at zero field and diffractive at high field. For the NBD mode, $I_d$, as expressed by equation (2), is set to zero in the quiescent state. Setting equation (2) equal to zero and solving for $\gamma$ yield equation (4):

$$\gamma = n\pi \quad (4)$$

In equation (4), once the value of n is chosen, the value of $\beta$ can be determined for a given $\Phi$. In the ON-states, the electric field drives the two reverse twisted domains 910, 920 into a polarization-rotation state so that the LC phase grating becomes diffractive.

Figure 10:
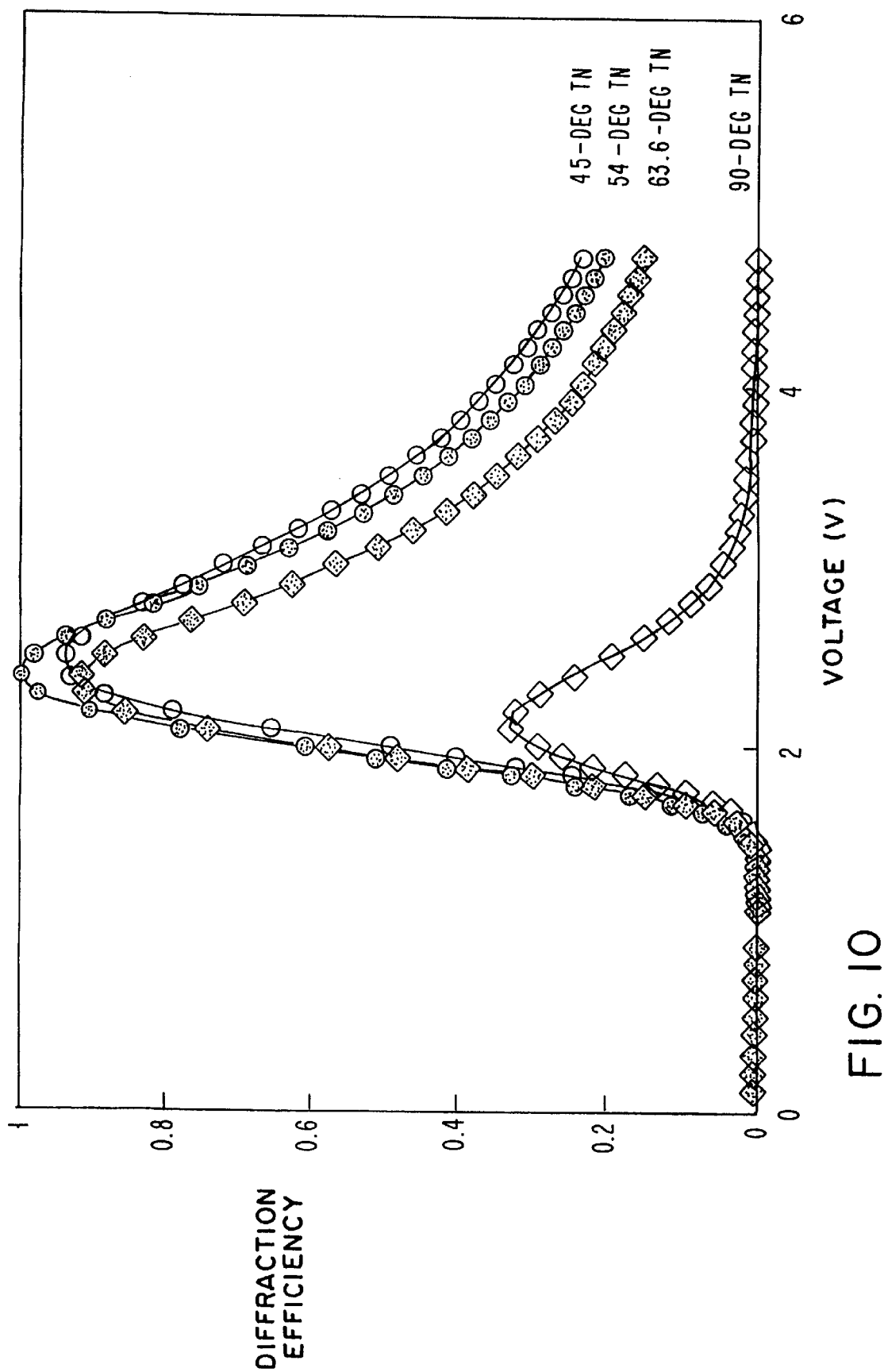
FIG. 10 shows plots of the optical diffraction efficiencies of various LC phase gratings as a function of applied voltage for different twist angles according to present invention.

As shown in Table I, the driving voltages for the NBD modes are much lower than those of the NWD modes. FIG. 10 shows plots of the optical diffraction efficiencies of TDOPT NBD LC phase gratings, listed in Table I, as a function of applied voltage for the twist angles $\Phi$ of 45° (0.25 π), 54° (0.3 π), 63.6° (0.3536 π), and 90° (0.5 π) for a nematic LC mixture referred to as TL222 from EM Merck, Germany. As shown in FIG. 10 and Table I, a diffraction efficiency of 99% is achieved using a 54° twist instead of the 91.8% efficiency for the 63.6° twist LC phase grating. This is due to the non-uniform twist of the liquid crystal molecules in field-on states.

The device parameters and the estimated optical efficiencies are listed in Table I. From Table I, it is seen that the operating voltages for NWD TDOPT LC phase gratings are 3.4 volts or larger. As for the NBD TDOPT LC phase gratings, the operating voltages are 2.5 volts or less.

Various methods of fabrication for a single domain twisted nematic cell have been described in the prior art. In one method, after the front and back substrates 120, 125 (FIG. 3) are properly cleaned, polyimide films (not shown) are coated on top of both substrates 120, 125 of the SLM by a spin-coating or an off-set printing method.

After the polyimde films have been properly annealed at elevated temperatures, rubbings on both front and back polyimide films are performed by a rotating wheel wrapped with velvet. Only one rubbing direction is required for the polyimide film of the front and back substrates 125, 120 (FIG. 3). After this rubbing, the LC directors are aligned along the rubbing direction with a small pretilt angle from the substrate plane. Thus, fabricating single-domain TN cells requires a total of two rubbing directions; one for each of the two polyimide films.

As in fabricating single-domain TN cells, there are several ways to fabricate two-domain opposite twist (TDOPT) LC phase gratings as a polarization independent device based on diffraction. The simplest case is using three different rubbing directions on the two cell substrates 120, 125. One rubbing direction is performed on the polyimide or orientation film coated on the ITO-coated transparent front glass substrate 120 of the SLMs. The other two rubbing directions are performed on the polyimide or orientation film coated on the reflective back substrate 125 of the SLM.

Figure 11:
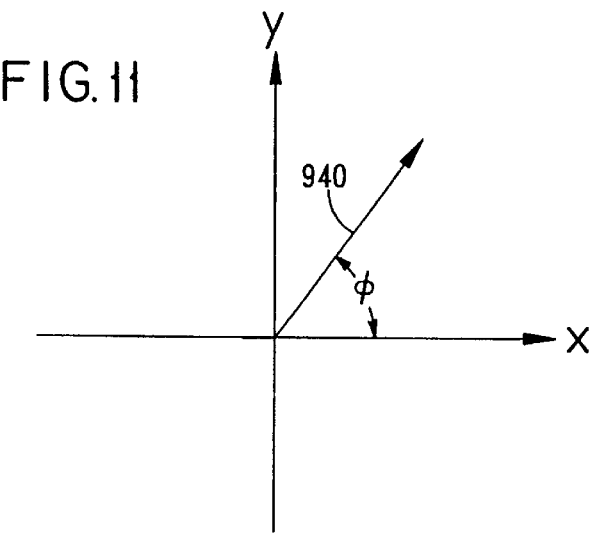
FIG. 11 shows a rubbing direction of a front polyimide film located on an ITO-coated front glass substrate of a spatial light modulator (SLM) to align LC directors according Lo present invention.
Figure 12:
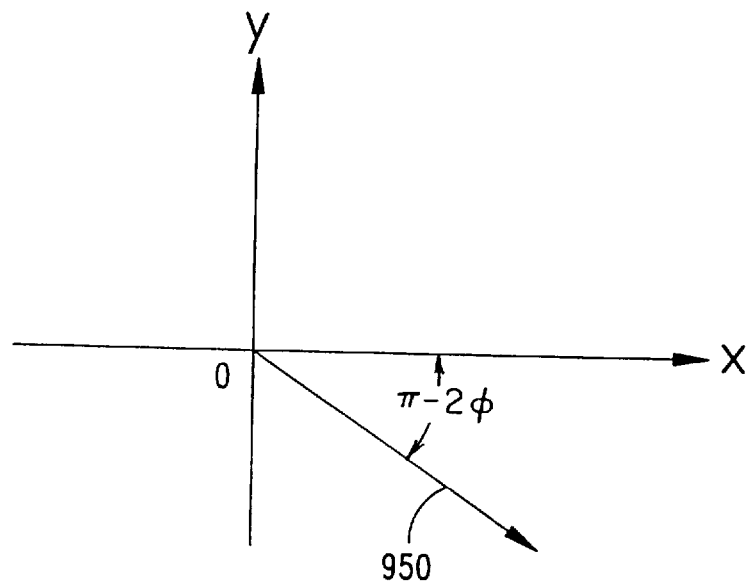
FIGS. 12 and 13 show two rubbing directions for a back polyimide film located on a pixel electrode formed on a back substrate of an SLM according to present invention.
Figure 13:
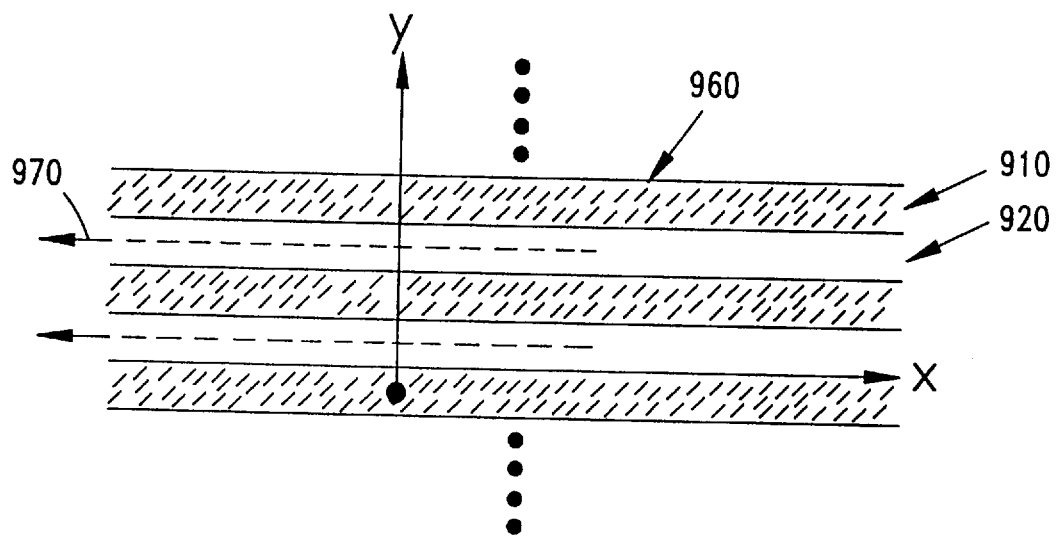

The step of fabricating the TDOPT LC phase gratings are shown in FIGS. 11–13. In FIGS. 11–13, the x-axis direction is defined for the LC cell similar to that of FIG. 9. During the cell assembly, the x-axis is aligned to coincide for both the front and back substrates 120, 125 (FIG. 3).

The rubbed polyimide films coated on both the front and back substrates 120, 125 are used for the alignment of LC medium. FIG. 11 shows the rubbing direction 940 of the front polyimide film located on the ITO-coated front glass substrate 120. As shown in FIG. 11, the front polyimide film rubbing direction forms a twist angle $+\Phi$ with respect to the x-axis. The twist angle is defined as positive when it rotates counter clockwise from the direction of the x-axis, and is defined as negative when it rotates clockwise from the direction of the x-axis.

FIGS. 12 and 13 show the two rubbing directions 950, 960, respectively, for the back polyimide film located on the reflective pixel electrode 140' formed on the back substrate 125. The two rubbing directions 950, 960, cause the opposite alignment of the directors that form the two domains 910, 920 shown in FIGS. 9 and 13.

First, the back polyimide film, which is located on the reflective pixel electrode 140' formed on the back substrate 125, is uniformly rubbed along the first back rubbing direction 950. As shown in FIG. 12, the first back rubbing direction 950 is at an angle having a magnitude of $(\pi-2\Phi)$ and a negative sign. That is, the first back rubbing direction 950 is clockwise from the x-axis or is at an angle of $(\pi-2\Phi)$ from the x-axis. Illustratively, as shown in FIGS. 11 and 12, if the twist angle $\Phi$ is 54°, for example, than the front rubbing direction 940 in FIG. 11 is 54°, while the first back rubbing direction 950 in FIG. 12, denoted as $(\pi-2\Phi)$, is 180−2(54)=72°.

As shown in FIG. 13, using conventional photo-lithographic processes, a photo-resist (PR) layer 960 is used to cover the areas corresponding to the first domain 910.

Next, a second back rubbing is performed on the back polyimide film which is partially covered by the PR layer 960 located over the alternating strips 910.

The direction 970 of the second back rubbing is along the negative x-axis. The exposed and rubbed portions of the back polyimide film correspond to the second domains 920. The second back rubbing direction 970, along the negative x-axis, is responsible for the alignment of LC directors in the second domains 920.

After the second back rubbing is completed, the PR layer 960 is removed from the first domain areas 910 of the back polyimide film. Next, the top and bottom substrates are assembled to form an LC cell, where the front polyimide film of the top or front substrate 120 has been rubbed in direction 940 shown in FIG. 11, and the back polyimide film portions 910, 920 of the bottom or back substrate 125 has been rubbed in the two back rubbing direction 950, 970, shown in FIGS. 12, 13, respectively.

Next, an optically active material is filled into the cell bounded by the front and back substrates 120, 125. For example, a nematic LC mixture with positive or negative anisotropy is vacuum-injected into the cell to form the TDOPT LC phase gratings.

Figure 14:
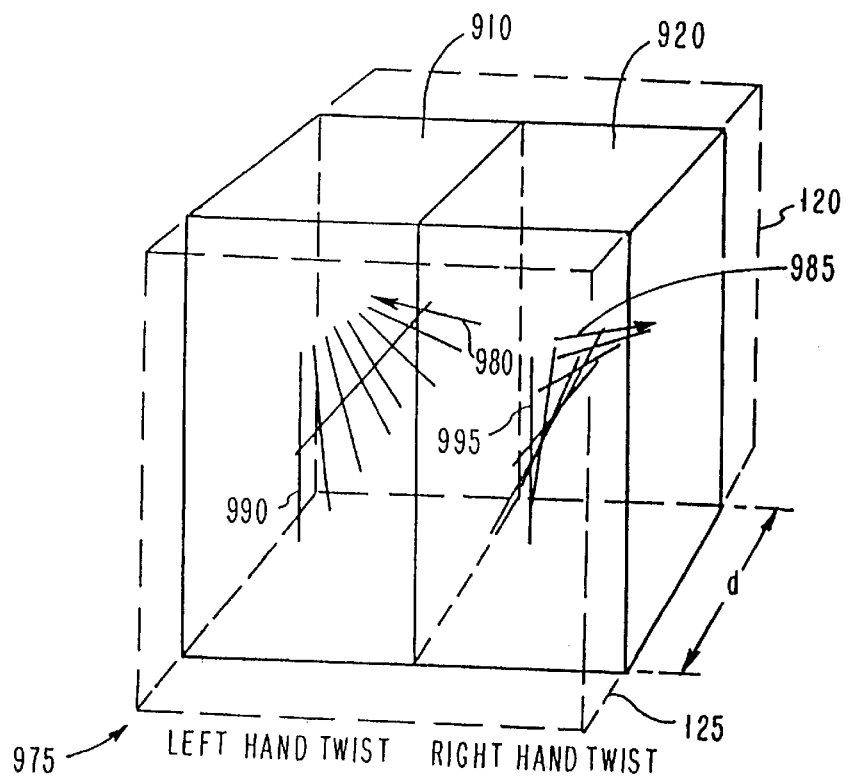
FIG. 14 shows a perspective view of the two adjacent domains of an LC cell having LC directors with an opposite-twist LC according to present invention.

FIG. 14 shows a perspective view of the two adjacent strips or domains 910, 920 of an LC cell 975 having LC directors 980, 985 with an opposite-twist LC. The front and back substrates 120, 125 are shown as dashed lines in FIG. 14.

Figure 6:
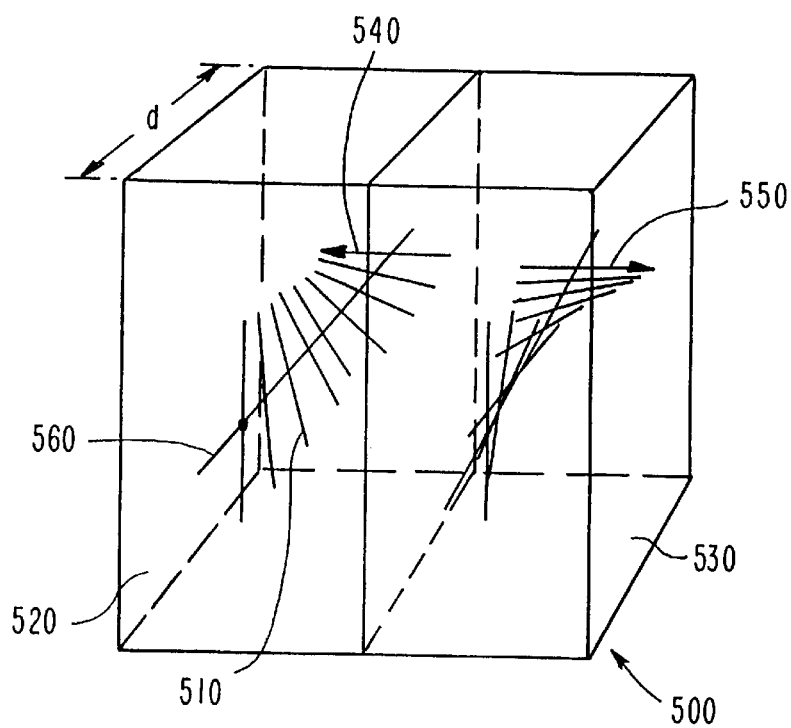
FIG. 6 is a conventional conceptual device with twisted liquid crystal (LC) material having twist angles of +90 and −90 that alternate between adjacent LC strips.

In comparison to FIG. 6 where the twist angles are +90°, the LC directors 980, 985 of FIG. 14 have a twist angle $\phi$ which is not +90°. Rather, the magnitude of the twist angle $\phi$ of the LC cell 975 is between approximately 45° to approximately 70°. Preferably, the twist angle $\phi$ of the LC cell 975 is approximately 54°. This is because a twist angle $\phi$ of 54° provides the maximum optical diffraction efficiency for all the NBD modes investigated described above, as shown in Table I.

The parameter d$\Delta$n of each strip 910, 920 of the LC cell 975 is approximately from 0.42 $\mu$m to 0.65 $\mu$m, where d is the thickness of the LC cell shown in FIGS. 3 and 14, and $\Delta$n is the anisotropy or birefringence of the LC medium or material of the LC cell 975. Preferably, parameter d$\Delta$n is approximately 0.52 $\mu$m.

As shown in FIG. 14, the twisted LC medium with the positive dielectric anisotropy or birefringence, has its boundary LC directors 990, 995 all aligned uni-directionally, i.e., in the same direction, which is approximately parallel to the back cell substrates 125.

In another embodiment, instead of the LC material having a positive dielectric anisotropy in the TDOPT LC phase gratings, an LC material having negative dielectric anisotropy is used. In this case, polyimide films are used which generate homeotropic or vertical alignment rather than homogeneous or parallel alignment for the LC mixtures with negative dielectric anisotropy.

In the case of negative dielectric anisotropy LC material, the NWD and NBD modes in Table I are now replaced by reverse NWD (RNWD) and reverse NBD (RNBD) modes, respectively. However, the last column of Table I, listing the operating voltages, is no longer valid. The RNWD modes are preferable, which are equivalent to NBD in Table I, because the RNWD modes have relatively low operating voltages as compared to RNBD modes.

For an LC cell having negative dielectric anisotropy LC material, the twist angle φ of the LC cell 975 is also between approximately 45° to approximately 70°. However, preferably, the magnitude of the twist angle φ of the LC cell 975 is approximately 63.6° in order to provide the maximum optical diffraction efficiency for all the RNWD modes.

If the LC cell 975 is filled with LC material having negative dielectric anisotropy, then the parameter dΔn of each strip 910, 920 is approximately from 0.16 μm to 0.24 μm. Preferably, parameter dΔn is approximately 0.2 μm.

In yet another embodiment, instead of using nematic LC mixtures in the TDOPT LC phase gratings, ferro-electric liquid crystal (F.C.) mixtures are used. Illustratively, the ferro-electric LC mixtures includes material referred to as CS-2001 and CS-2002 from Chisso Corporation (Japan). The F.C. mixtures have shorter response times than nematic LC mixtures. The structure and alignment methods discussed above with regard to the nematic LC mixtures is directly applicable to ferro-electric LC mixtures.

Alternative methods to form TDOPT LC phase gratings include, for example, replacing the rubbing directions 940, 950, 970 in FIGS. 11–13 by one of the following:
1. an oblique-evaporation directions of SiOx;
2. a coating directions of Langmuir Blodgett films for LC alignment;
3. an incident direction of ion beams for LC alignment; or
4. polarization directions (or perpendicular to the polarization directions) of ultra-violet (UV) radiation impinging on polymer films to form directions for LC alignment.

Although the description of the present invention has been directed to an LC cell used in a reflective SLM, the LC cell is equally used in a transmissive SLM. Thus, inventive LC cell is used in displays, such as projection displays having either reflective or transmissive SLMs.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described the invention, what is claimed as new and desired to be secured by Letters Patent is:

1. A liquid crystal (LC) cell having normally black diffractive LC phase gratings comprising alternating strips of a first single domain LC material having a twist angle with a magnitude and a positive sign, and a second single domain LC material having a twist angle with said magnitude and a negative sign, said magnitude being less than 90 degrees and approximately from 45 to 70 degrees.

2. The LC cell of claim 1, wherein said first and second LC materials are twisted nematic LC materials.

3. The LC cell of claim 1, wherein said first and second LC materials are ferro-electric LC materials.

4. The LC cell of claim 1, wherein said first and second LC materials have a positive dielectric anisotropy.

5. The LC cell of claim 4, wherein said magnitude is approximately 54 degrees.

6. The LC cell of claim 4, wherein each of said alternating strips has a value for a parameter dΔn from approximately 0.42 μm to approximately 0.65 μm, where d is a cell gap and Δn is birefringence of said first and second LC materials.

7. The LC cell of claim 4, wherein each of said alternating strips has a value for a parameter dΔn of approximately 0.52 μm, where d is a cell gap and Δn is birefringence of said first and second LC materials.

8. The LC cell of claim 1, wherein said first and second LC materials have a negative dielectric anisotropy.

9. The LC cell of claim 8, wherein said magnitude is approximately 63.6 degrees.

10. The LC cell of claim 8, wherein each of said alternating strips has a value for a parameter dΔn from approximately 0.16 μm to approximately 0.24 μm, where d is a cell gap and Δn is birefringence of said first and second LC materials.

11. The LC cell of claim 8, wherein each of said alternating strips has a value for a parameter dΔn of approximately 0.2 μm, where d is a cell gap and Δn is birefringence of said first and second LC materials.

12. A display comprising one of transmissive and reflective spatial light modulators (SLMs), said one SLM having a liquid crystal (LC) cell sandwiched between two electrodes for providing an electric field across said LC cell, said LC cell having normally black diffractive LC phase gratings comprising alternating strips of a first single domain LC material having a twist angle with a magnitude and a positive sign, and a second single domain LC material having a twist angle with said magnitude and a negative sign, said magnitude being less than 90 degrees and approximately from 45 to 70 degrees.

13. The display of claim 12, wherein said first and second LC materials are twisted nematic LC materials.

14. The display of claim 12, wherein said first and second LC materials are ferro-electric LC materials.

15. The display of claim 12, wherein said first and second LC materials have a positive dielectric anisotropy.

16. The display of claim 15, wherein said magnitude is approximately 54 degrees.

17. The display of claim 15, wherein each of said alternating strips has a value for a parameter dΔn from approximately 0.42 μm to approximately 0.65 μm, where d is a cell gap and Δn is birefringence of said first and second LC materials.

18. The display of claim 15, wherein each of said alternating strips has a value for a parameter dΔn of approximately 0.52 μm, where d is a cell gap and Δn is birefringence of said first and second LC materials.

19. The display of claim 12, wherein said LC material has a negative dielectric anisotropy.

20. The display of claim 19, wherein said magnitude is approximately 63.6 degrees.

21. The display of claim 19, wherein each of said alternating strips has a value for a parameter dΔn from approximately 0.16 μm to approximately 0.24 μm, where d is a cell gap and Δn is birefringence of said first and second LC materials.

22. The display of claim 19, wherein each of said alternating strips has a value for a parameter dΔn of approximately 0.2 μm, where d is a cell gap and Δn is birefringence of said first and second LC materials.

* * * * *

UNITED STATES PATENT AND TRADEMARK OFFICE
CERTIFICATE OF CORRECTION

PATENT NO. : 5,883,687
DATED : March 16, 1999
INVENTOR(S) : Minhua Lu, et al.

It is certified that error appears in the above-identified patent and that said Letters Patent is hereby corrected as shown below:

Column 3, line 44: " $Sio_2$ " should read -- $SiO_2$ --

Column 14, lines 35 & 37: " $+90°$ " should read -- $\pm 90°$ --

Signed and Sealed this

Twenty-first Day of September, 1999

Attest:

Q. TODD DICKINSON

*Attesting Officer*      *Acting Commissioner of Patents and Trademarks*